(No Model.)

J. & A. ZEHREN.
VALVE AND CUT-OFF FOR STEAM, WATER, OR OTHER PIPES.

No. 433,060. Patented July 29, 1890.

Witnesses
Geo. W. Young
N. E. Oliphant

Inventors.
Jean Zehren
Auguste Zehren
By Stout & Underwood
Attorneys

THE NORRIS PETERS CO., PHOTO-LITHO., WASHINGTON, D. C.

UNITED STATES PATENT OFFICE.

JEAN ZEHREN AND AUGUSTE ZEHREN, OF PARIS, FRANCE, ASSIGNORS TO NICHOLAS KOCH, OF MILWAUKEE, WISCONSIN.

VALVE AND CUT-OFF FOR STEAM, WATER, AND OTHER PIPES.

SPECIFICATION forming part of Letters Patent No. 433,060, dated July 29, 1890.

Application filed April 30, 1888. Serial No. 272,257. (No model.)

*To all whom it may concern:*

Be it known that we, JEAN ZEHREN and AUGUSTE ZEHREN, of Paris, France, have invented certain new and useful Improvements in Valves and Cut-Offs for Steam, Water, and other Pipes; and we do hereby declare that the following is a full, clear, and exact description thereof.

Our invention relates to valves and cut-offs for steam, water, and other pipes, and will be fully described hereinafter.

Figure 1:
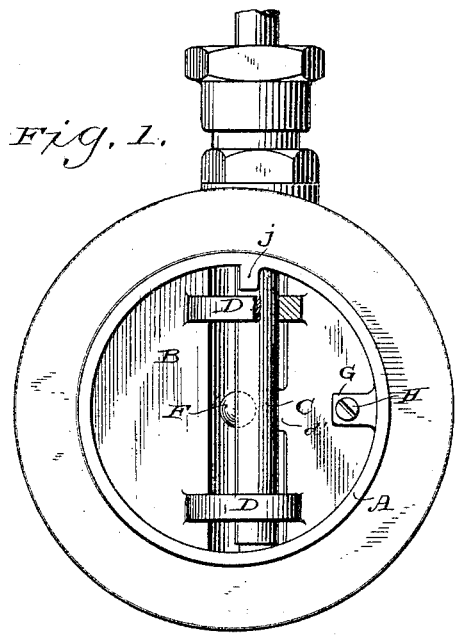
Figure 2:
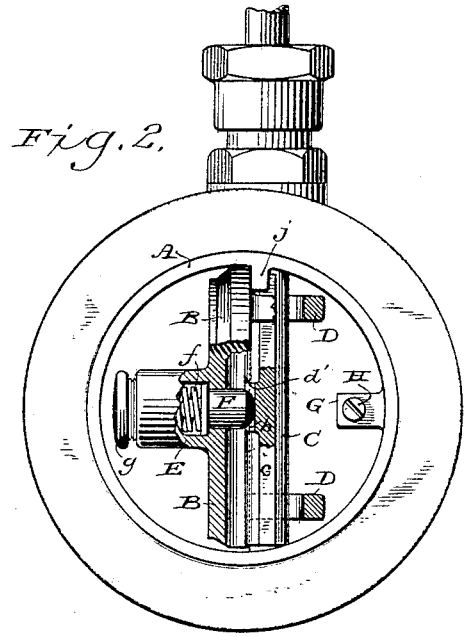
Figure 3:
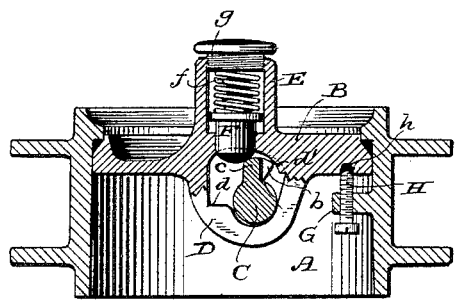
Figure 4:
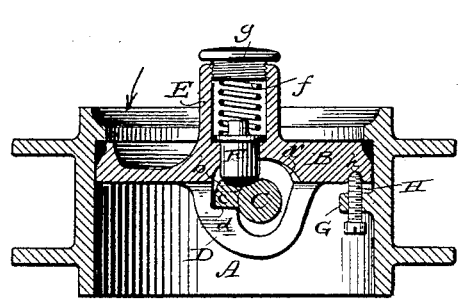
Figure 5:
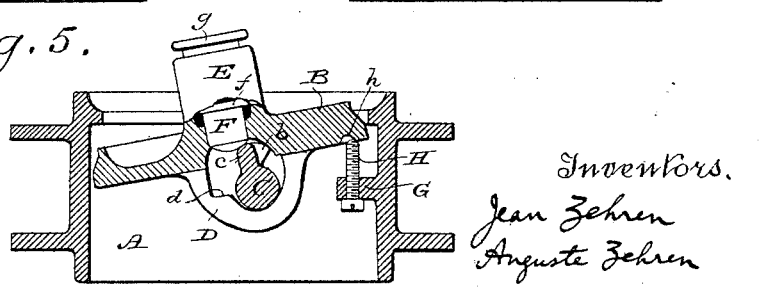

In the drawings, Figure 1 is an end view of a valve-chamber with our valve in place therein and closed. Fig. 2 is a like view with the valve open and partly in section. Fig. 3 is a section through the center of the valve-chamber and valve, the latter being closed and locked on its seat. Fig. 4 is a like view before the valve is locked, and Fig. 5 is a view showing the valve partly closed and locked in that position.

A is the valve-chamber.

B is the valve, and C is the valve-rod, which also forms the axis of the valve.

D are yokes that project outward from the valve, which yokes are provided with shoulders $d$, for the flange $c$ of the valve-rod to engage with when it is turned to open the valve. The valve is also formed with a hollow boss E, that extends inward from it above the line of its vertical center, and this boss opens through the valve and is to receive a plunger F, that extends through the valve to oppose the flange $c$ of the valve-rod under pressure of a spring $f$, the tension of which is regulated by a screw-cap $g$. The outer face of the valve B is concaved at the mouth of the opening through which the plunger F extends, and the flange $c$ of the valve-rod is formed with a rounded shoulder $b$, which, when the flange is in the position shown in Figs. 3 and 4, wedges between the adjacent wall of the concave $d'$ and the rounded end of the plunger and locks the valve in position until sufficient force is applied to the valve-rod to force the plunger back out of the way and thus unlock the valve. The valve is prevented from turning more than half-way, as in our patent, No. 373,000, granted November 8, 1887, by a lug $j$.

G is a lug that projects inward from the upper portion of the valve-chamber, and through this lug is a screw-threaded opening to receive a stop-screw H, the point of which is designed to fit in a depression $h$ in the inner face of the valve.

The operation of our device is as follows: When the parts are in the position shown in Fig. 4, the valve is closed, but is not locked to its seat, and therefore pressure from the direction indicated by the arrow, bearing on the long side of the valve, will overbalance it and cause it to open. To close the valve, the valve-rod is turned until its flange $c$ wedges past the end of plunger F, the screw H acting as a fulcrum for the valve, which in closing becomes a lever of the second power, and when it is desired to lock the valve in a partly-closed position the screw H is screwed in, as shown in Fig. 5, far enough to hold the valve at an angle to its seat, where it will be held securely after the flange has been forced beyond the end of plunger F, so that it and its shoulder will be wedged securely between the end of the plunger and the wall of concave $d'$ until sufficient force is exerted on the valve-rod in a reverse direction to force the plunger out of the way, when the flange $c$, striking the shoulder $d$, will lift the valve out of its seat, as in Fig. 4, to permit the pressure in the pipe to open the valve, as before stated.

Having thus fully described our invention, what we claim as new, and desire to secure by Letters Patent, is—

The combination of the valve B, having the shouldered yokes D, spring-plunger F, and concave $d'$, the rod C, forming the axis of the valve and provided with the flange $c$, having the shoulder $b$, and the adjustable fulcrum H, substantially as set forth.

In testimony that we claim the foregoing we have hereunto set our hands, at Paris, France, in the presence of two witnesses.

JEAN ZEHREN.
AUGUSTE ZEHREN.

Witnesses:
H. HUAUS,
ROBT. M. HOOPER.